Jan. 19, 1960  F. G. MILLER  2,921,784
ENGINE DOLLY
Filed Feb. 21, 1956  10 Sheets-Sheet 1
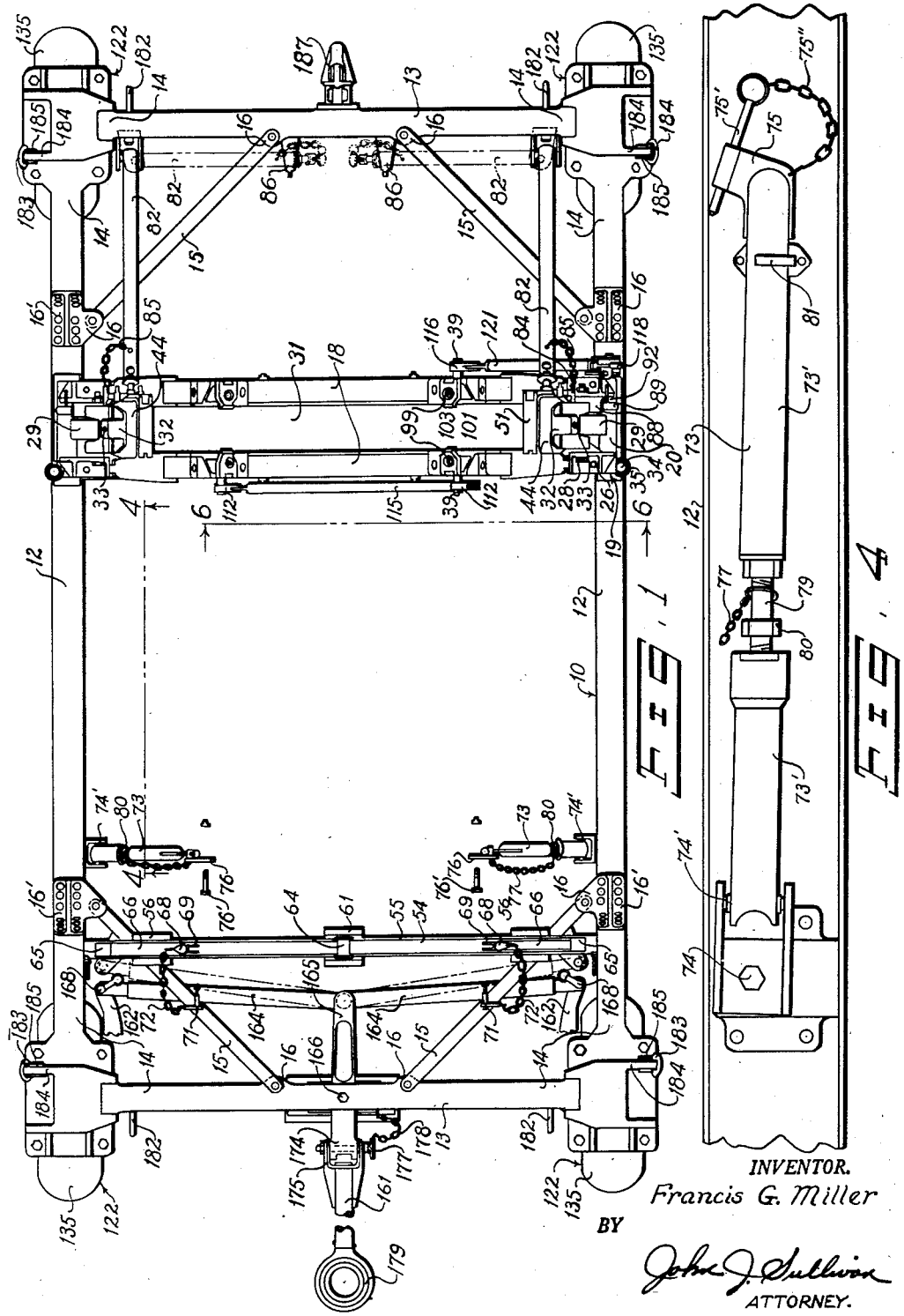
INVENTOR.
Francis G. Miller
BY
John J. Sullivan
ATTORNEY.

Jan. 19, 1960     F. G. MILLER     2,921,784
ENGINE DOLLY
Filed Feb. 21, 1956     10 Sheets-Sheet 2
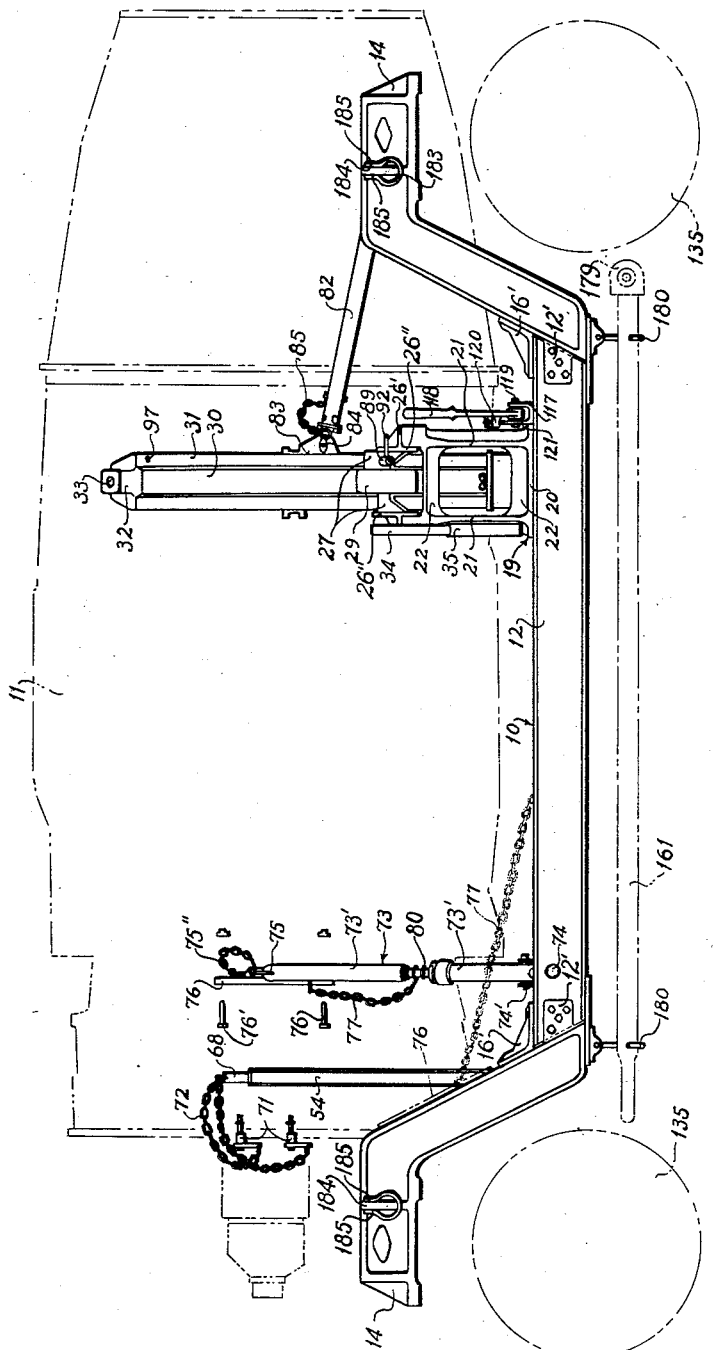
INVENTOR.
Francis G. Miller
BY
John J. Sullivan
ATTORNEY.

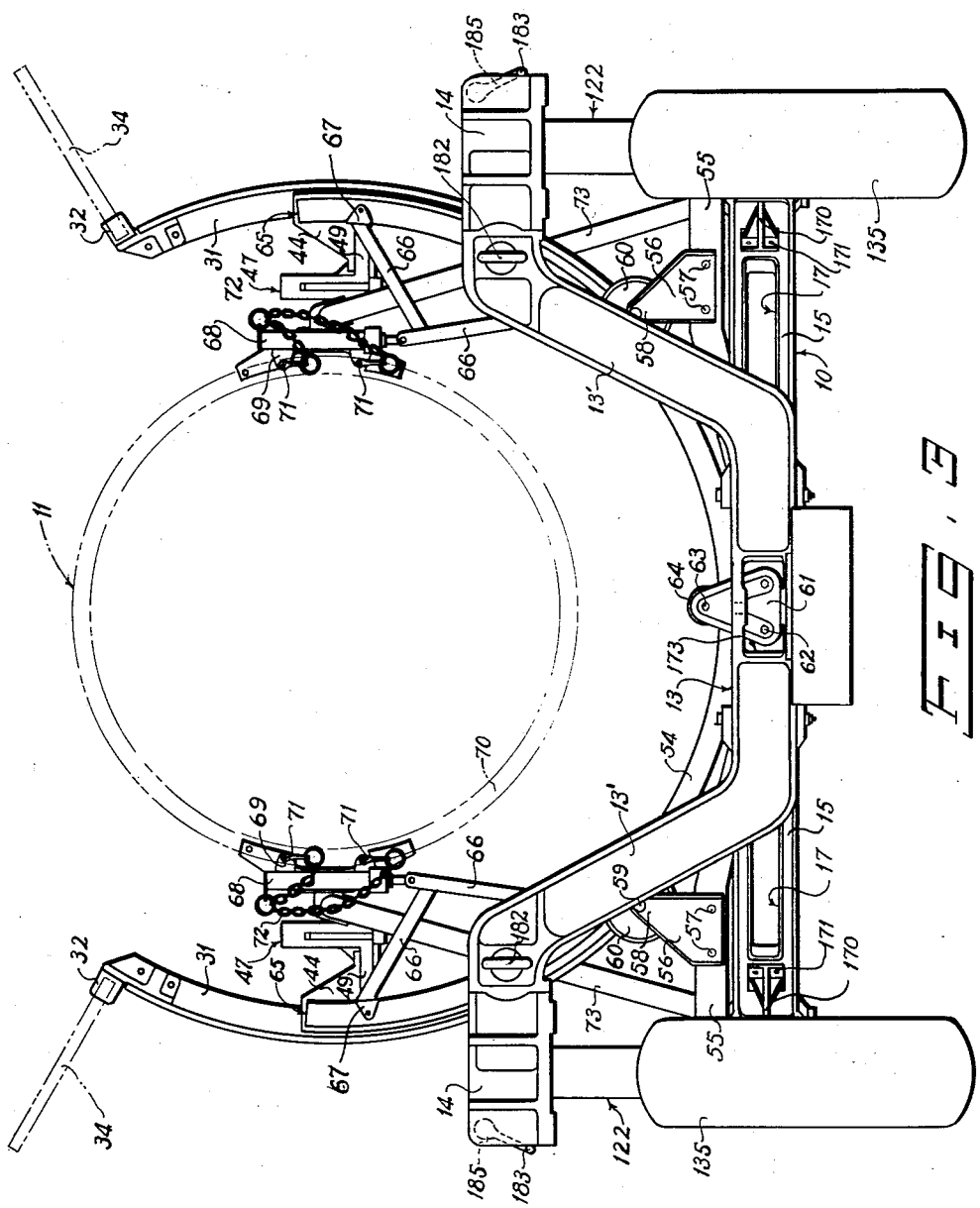

Jan. 19, 1960  F. G. MILLER  2,921,784
ENGINE DOLLY

Filed Feb. 21, 1956  10 Sheets-Sheet 5

INVENTOR.
Francis G. Miller
BY
John J. Sullivan
ATTORNEY.

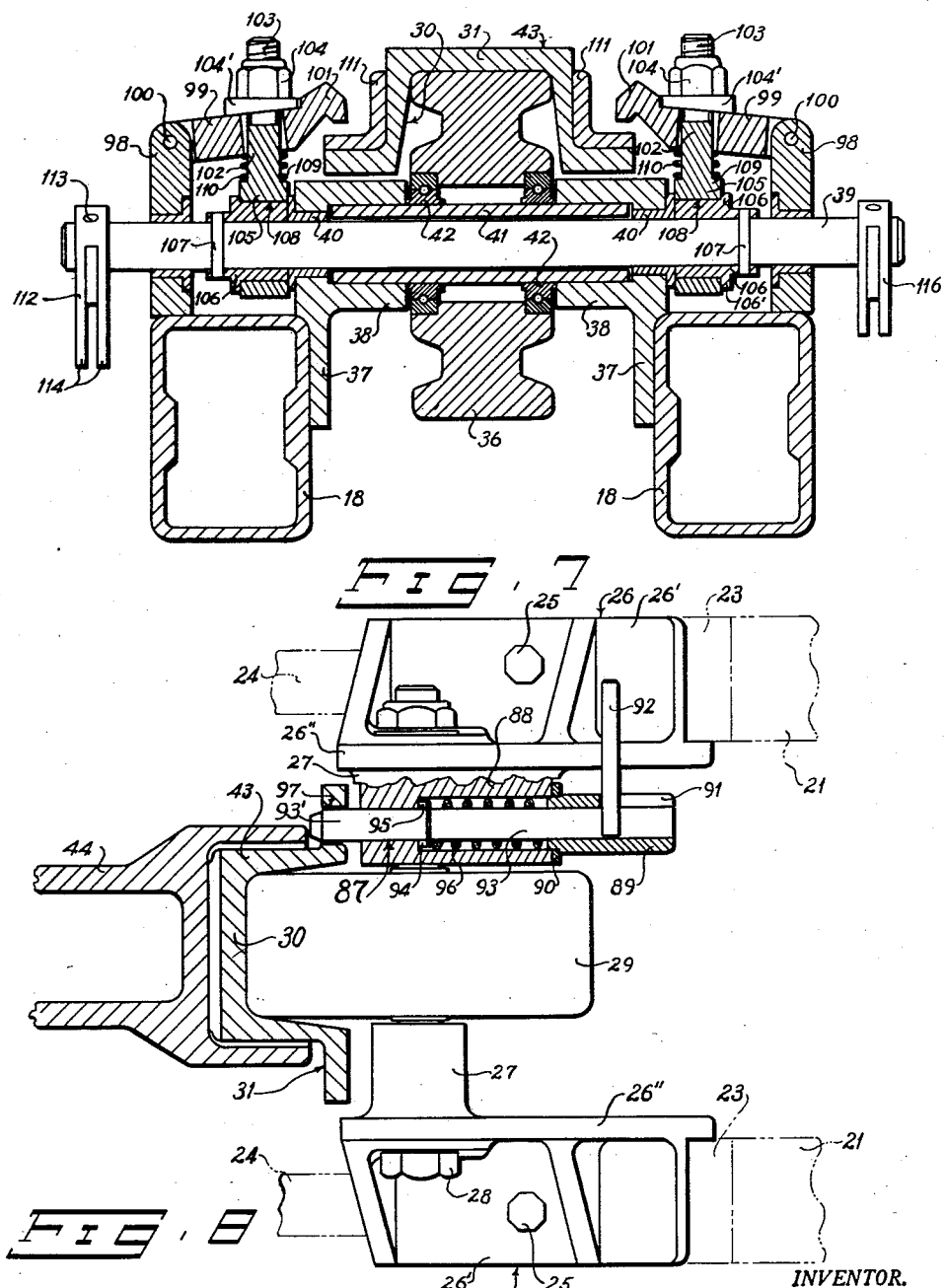

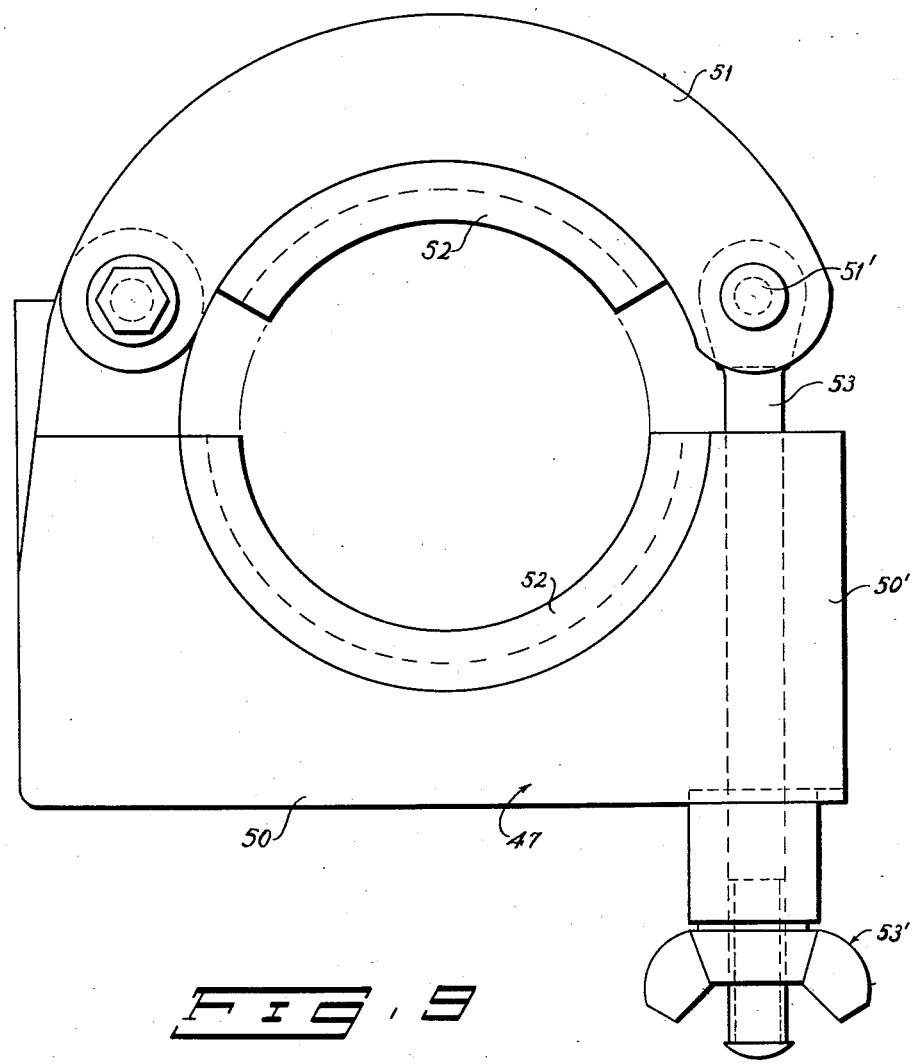

Jan. 19, 1960     F. G. MILLER     2,921,784
ENGINE DOLLY
Filed Feb. 21, 1956     10 Sheets-Sheet 8
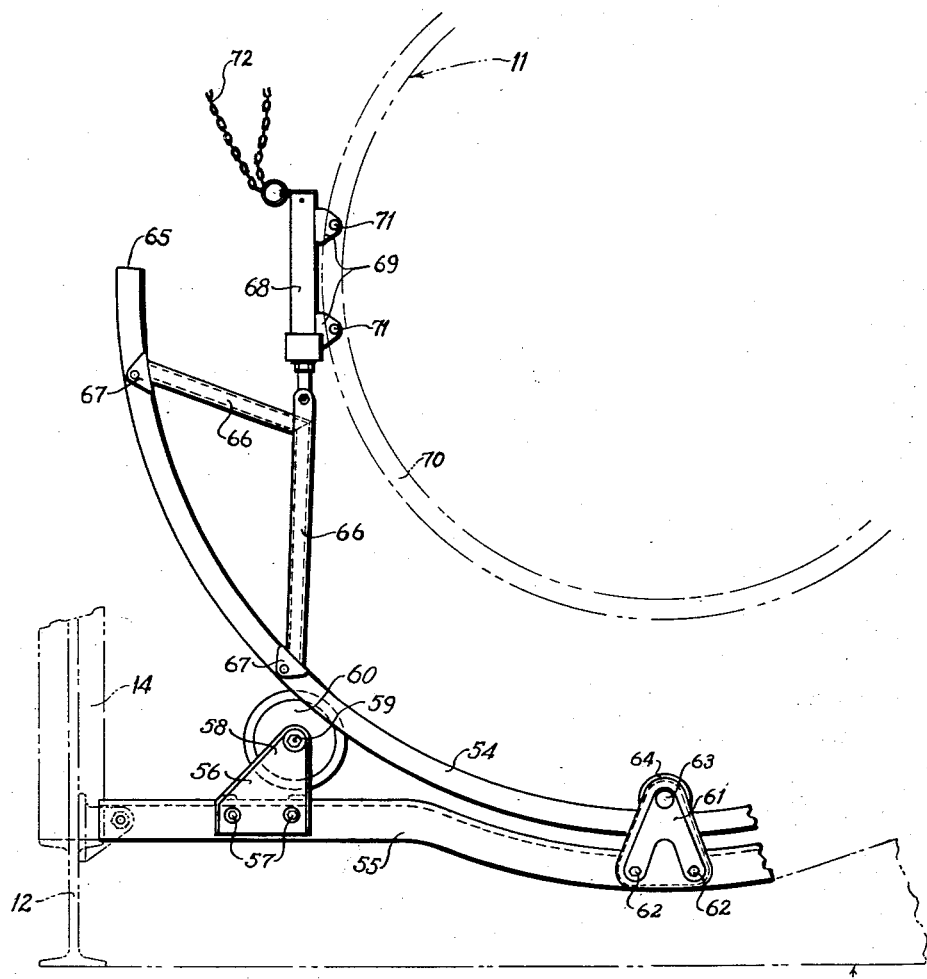
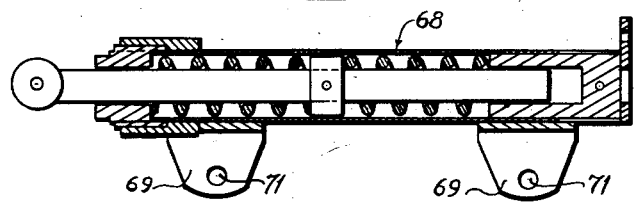
INVENTOR.
Francis G. Miller
BY
*John J. Sullivan*
ATTORNEY.

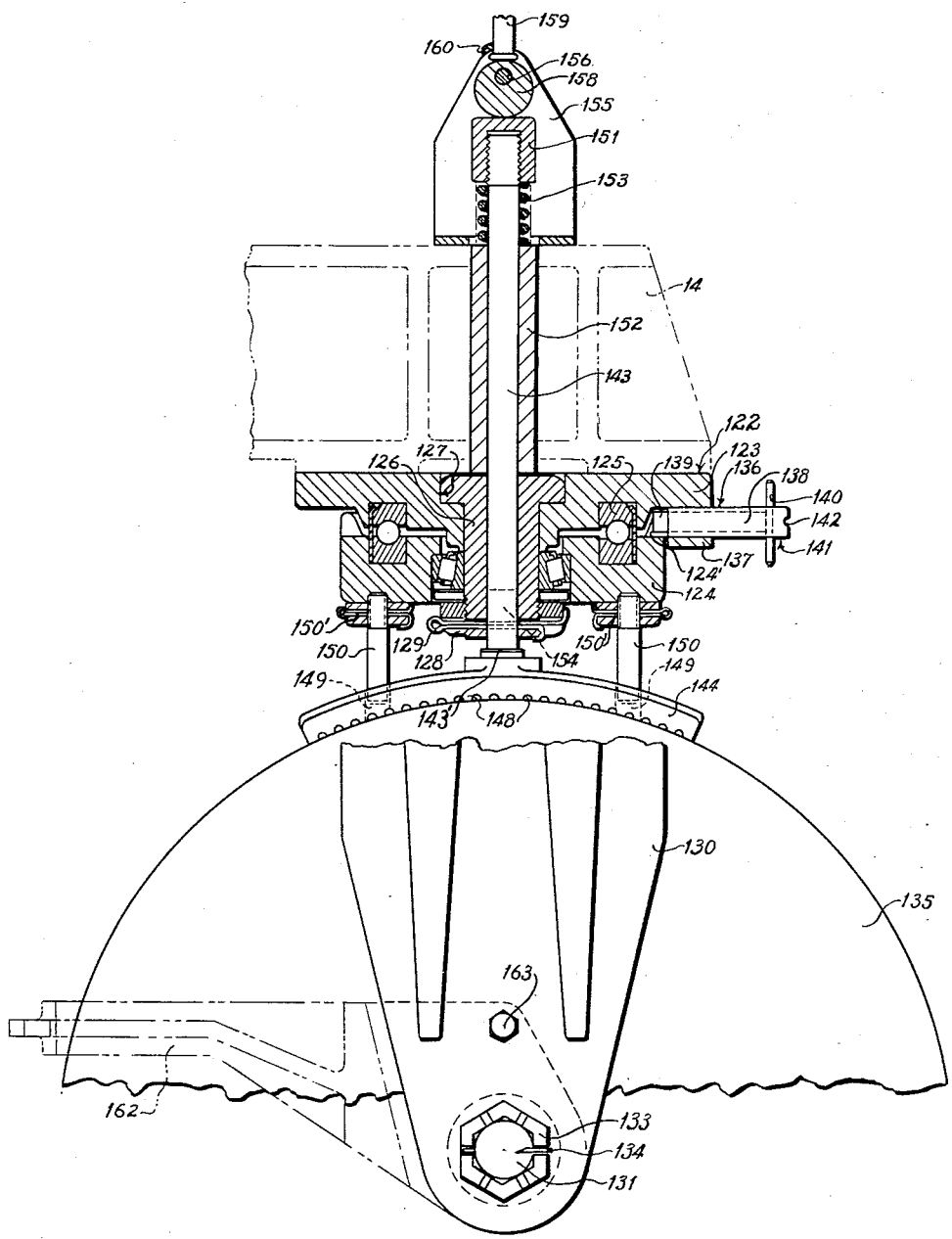

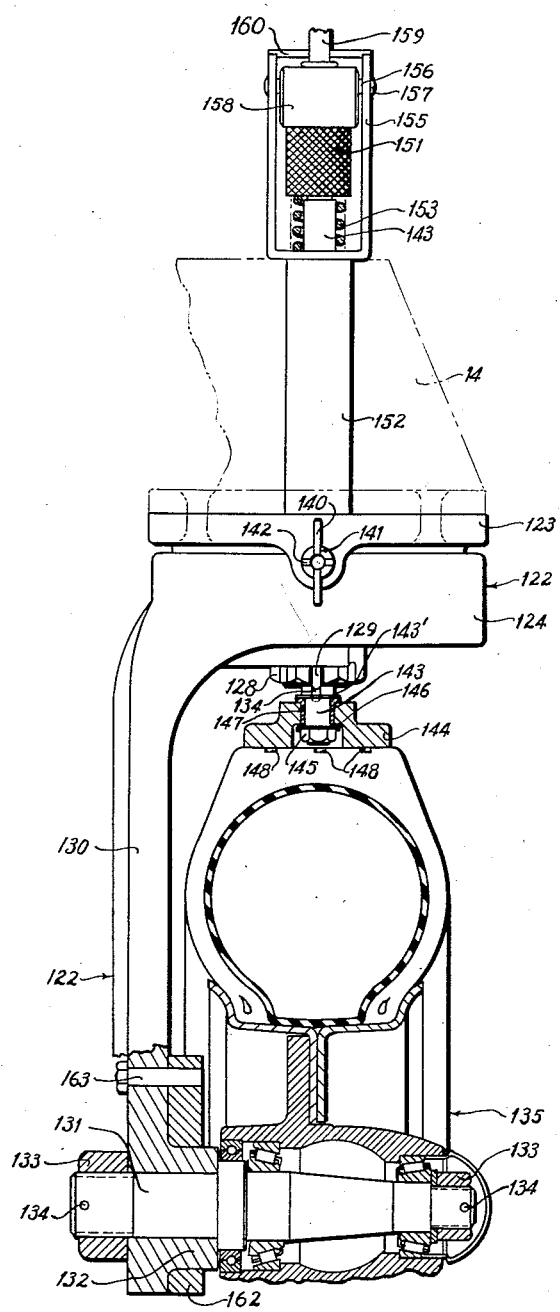

United States Patent Office 2,921,784
Patented Jan. 19, 1960

2,921,784

ENGINE DOLLY

Francis G. Miller, Farmingdale, N.Y., assignor to Republic Aviation Corporation, near Farmingdale, Suffolk County, N.Y., a corporation of Delaware Application February 21, 1956, Serial No. 566,792

11 Claims. (Cl. 269—112)

This invention relates in general to dollies or trucks for engines and more particularly to a truck or dolly in and on which an engine may be mounted for servicing, transporting, storing, shipment and at virtually all times save when installed.

More specifically, the present invention has in view a dolly or truck equally suitable and adapted for transporting an engine on the road as well as in and around localized areas prior to its installation in, or after removal from, its position for actual use as a power plant. At the same time the engine is so mounted on the dolly that its position thereon may be readily manipulated, altered and adjusted to render every external fitting and accessory thereof easily accessible to facilitate its initial assembly, as well as its subsequent servicing or maintenance.

Among its other objects the instant dolly contemplates a vehicle on which an engine may be mounted and retained for shipment. In transportation of engines by air relative movement between the engine and the structure in which it is mounted should be eliminated or greatly reduced. Thus, the engine should be maintained fixed or stationary under all operational conditions of the air transport including landing and take-off and this is accomplished by the subject dolly or truck.

Additionally, this invention also contemplates a dolly or truck on which an engine may be mounted for testing its operation, i.e., the initial run-up of the engine prior to its installation in the vehicle such as an aircraft.

With the above and other object in view, as will be apparent, this invention consists in the construction, combination and arrangement of parts all as hereinafter more fully described, claimed and illustrated in the accompanying drawings, wherein:

Fig. 1 is a plan elevation of a dolly constructed according to the present invention with some of the component parts thereof shown in phantom lines to indicate a second or stowed position of such parts;

Fig. 2 is a side elevation of the dolly illustrated in Fig. 1 with the wheels, the stowed components and the outline of an engine mounted therein, shown in phantom lines;

Fig. 3 is a front elevation of the dolly with some of its components removed and with the forward end of an engine (outlined in phantom lines) carried thereby to illustrate the mounting of the engine in association with the dolly;

Fig. 4 is a view taken along line 4—4 of Fig. 1 to show the manner in which the auxiliary supporting braces for the engine are stowed within the chassis of the truck when not actually in use;

Fig. 7 is a section taken along line 7—7 of Fig. 6 to show the operation of one set of the lock mechanisms for securing the engine to the dolly or truck.

Fig. 8 is a section taken along line 8—8 of Fig. 6 to illustrate the means by which the position of the engine relative to the dolly or truck is selectively located or indexed;

Fig. 9 is a view taken along line 9—9 of Fig. 6 to show the means by which the engine is mounted on and secured to the main supporting member or cradle;

Fig. 10 is a front elevation of one symmetrical half of the forward auxiliary supporting member or cradle for the engine and shows the means of attaching the engine to such cradle and the means by which the engine may rotate in unison with the cradle relative to the dolly or truck, the outline of the engine and associated parts of the chassis being illustrated in phantom lines;

Fig. 11 is a longitudinal section taken through part of the attaching means shown in Fig. 10 to illustrate the shock-absorbing mechanism associated therewith;

Figure 5:
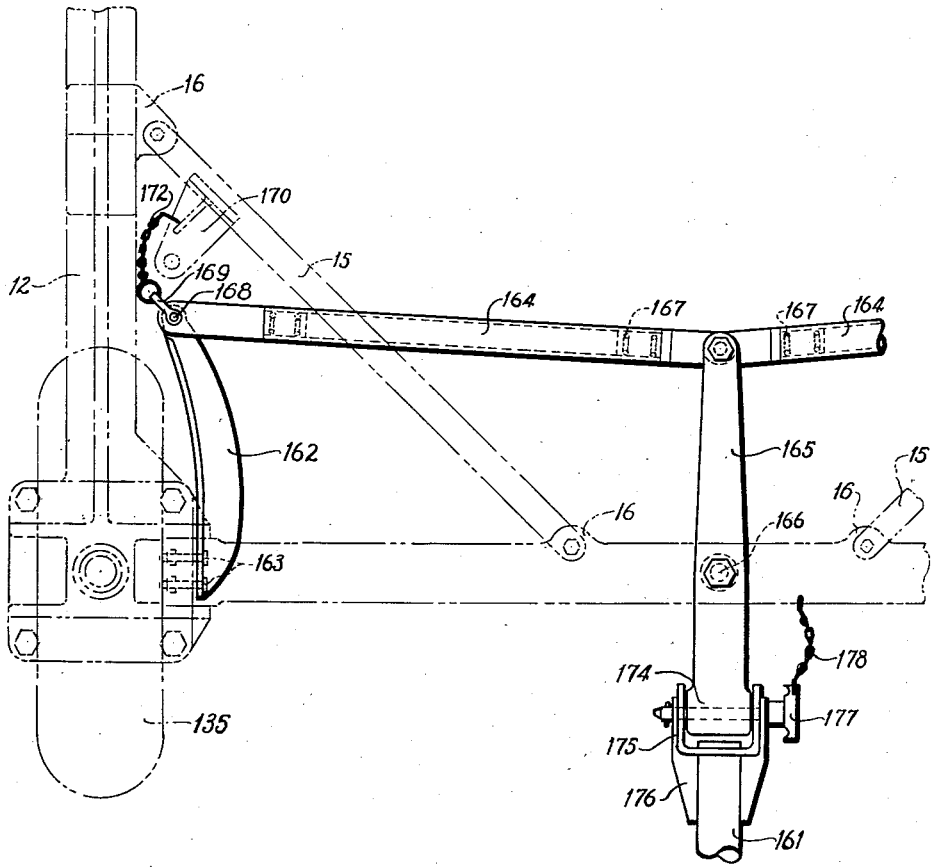
Fig. 5 is a plan view of the front portion of the present truck to show one symmetrical half of the steering mechanism therefor with the associated portion of the chassis in phantom lines.

Fig. 12 is a partial vertical section taken through one of the front wheel mounts to show the means by which the wheel is mounted on the chassis both for steering and free castering, the associated control for rendering these mechanisms inoperative whereby the wheel may be locked in a selected position relative to the truck or dolly and the brake mechanism operable on and against the outer surface of the tire to secure it against rotation; and Fig. 13 is a partial vertical section through the wheel and its mount taken at right angles to Fig. 12.

While the present truck or dolly is designed to hold and support any type of engine during servicing, shipment, transporting, etc., it has particular utility when so employed in conjunction with jet engines for use in aircraft. By and large, such engines are not only heavier, larger and bulkier, but are considerably more intricate and complex than reciprocating engines. Thus, if the present truck or dolly is suitable for jet engines, it may be said generally that it will be adaptable for reciprocating engines. Therefore, the present truck or dolly will be illustrated and described in conjunction with jet aircraft engines.

From the initial assembly or build-up of an aircraft until its retirement the engine is repeatedly removed from and installed in the airframe. Since the engine of a present-day aircraft represents a substantial portion of the aircraft, it is difficult to handle and manipulate both in its initial assembly and its installation in an airframe and its subsequent servicing, maintenance and storage after removal from the airframe.

The actual installation of an engine in, and removal from, the airframe is accomplished by means of derricks, cranes and other powerful lifting devices. This invention proposes no change in this practice, nor has it any connection with the actual installation or removal per se of the engine into and out of the airframe. However, prior to and after such installation and removal various trucks and dollies are presently employed to facilitate the moving of the engine about from place to place for the purpose of maintenance, servicing and the like. During this time specially designed trucks or stands are employed to hold the engine while it is being worked on, and still additional containers and frames are employed for housing and mounting the engine for shipment from place to place aboard carriers such as air cargo planes, boats, trucks or railroad cars. In addition to these, special test stands or structures have been constructed for the engine on which initial and subsequent run-ups or test operations of the engines may be conducted.

In short, prior to the time when the engine is initially installed in the airframe or between the time it is removed therefrom and the time it is reinstalled in the airframe, many operations are necessary in shifting or moving the engine from stand to stand or stand to truck, or truck to truck, in order that it may be worked on, transported, shipped or, in general, prepared for actual installation or reinstallation in the airframe.

It is the purpose of the present invention to eliminate the foregoing, as well as other problems involved in the handling of an engine. To that end, a so-called universal dolly or truck is proposed, on and to which an engine may be mounted and remain at all times when it is not actually in the airframe. Thus, when the engine is received (and this may be considered as typical) by the airframe manufacturer from the engine manufacturer, it is uncrated and immediately placed on and mounted to the instant truck. From then on it remains on this truck or dolly throughout the build-up operation, general as well as road transportation, shipment aboard a carrier and even during the initial run-up or operation of the engine. Only after all the foregoing preliminary operations have been completed and the engine is ready to be installed in the aircraft, is it removed from the present truck or dolly.

Similarly, when it is necessary to remove the engine from the aircraft for any reason, it is again placed on the instant truck or dolly where it remains at all times during servicing, transporting, storing, etc., or until such time as it is to be reinstalled in the airframe.

Referring now more particularly to the drawings, 10 designates a generally rectangular frame forming the chassis of the present truck on and to which an engine 11 is to be mounted to the end that said engine may be worked on, serviced, transported, shipped, etc. The frame or chassis 10 consists of a pair of identical side members or I-beams 12 and end members or I-beams 13 disposed between and interconnecting corresponding ends of the side members 12. The ends of both the side beams 12 and the end beams 13 terminate in angular offsets or upwardly extending extremities 14. These end portions 14 of the beams 12 and 13 may be integrally formed thereon as at 13' (Fig. 3) or may consist of separate members bolted or otherwise secured to these beams as at 12' (Fig. 2) to effectively form integral parts thereof. Each of the angularly disposed extremities 14 associated with the end member 13 is identical one with the other, as is each of the angularly disposed extremities 14 of the side members 12.

From the foregoing it is apparent that the main portions of the side members 12 and end members 13 are disposed in a common plane below the common plane of the angularly disposed extremities 14 thereof. Thus the chassis 10 may be said to be suspended from its corners below the level of the extremities 14 of the sides 12 and ends 13.

In order to strengthen the chassis 10 and preserve the generally rectangular shape thereof, a diagonal brace or beam 15 is provided at and across each corner of the chassis 10 between the ends 13 and sides 12. Each of these beams or braces 15 terminates in a bifurcation at its opposed ends to receive therein the associated end and side members 13 and 12. If desired, the bifurcations at the ends of the braces 15 may engage and be secured to a projecting ear or lug 16 provided on each of the side and end members 12 and 13 at the point of connection of the braces 15 thereto. These ears or lugs 16 may be integrally formed on the sides and ends 12 and 13 or integrally formed on a mounting plate 16' which in turn is secured to said members 12 and 13 in any appropriate manner.

Each of the corner braces 15 at the forward end of the chassis 10 is provided with an elongated slot 17 (Fig. 3) medially of its length for purposes to be described. These slots 17 also have the further advantage of reducing the overall weight of the truck or dolly with no appreciable reduction in its structural rigidity or strength.

Two spaced transverse, parallel structural beams 18 are interposed between the sides 12 of the chassis 10 toward the aft or rear end thereof and each is bolted or otherwise secured at its ends to the adjacent side 12 so as to become a fixed and permanent part of the chassis. A vertical supporting frame 19 is mounted on, and secured to, the upper surface of each side member 12 of the chassis 10 by any suitable means so as to be disposed centrally between the ends of the transverse beams 18, said supporting frames 19 being aligned transversely of the chassis 10. Each of these supporting frames 19 consists of a base plate 20 (Fig. 2) adapted to rest flush upon the upper surface of the side member 12 and a pair of spaced parallel uprights 21 which are connected one to the other and relatively braced by one or more webs 22 interposed therebetween. Hence, one upright 21 of each frame 19 on opposite sides of the chassis 10 is disposed in substantial alignment with one of the beams 18.

At their upper ends the uprights 21 of each supporting frame 19 terminates in an arm 23 (Figs. 6 and 8) projecting laterally and horizontally from the frame inwardly of the chassis 10. The top surface of each arm 23 on one side of the chassis 10 is in substantially the same horizontal plane and in the horizontal plane of the top surface of the arms 23 on the opposite side of the chassis 10. A supporting leg or brace 24 is interposed between the free end of each arm 23 and the associated beam 18 and is fixedly secured at its ends to said arm and said beam in any suitable and well-known manner, such as for example by a bolt 23'. Thus, a brace 24 is associated and cooperates with each upright 21 of the supporting frame 19 to dispose and maintain each arm 23 in a horizontal position relative to the chassis 10.

Fixedly mounted on and to the top surfaces of the arms 23 of each upright 21 by means such as one or more bolts 25, is an angular bracket 26, one side 26' of each said bracket resting flush against the upper face of the associated arm 23. The other side 26" of each bracket 26 extends both downwardly to abut the inner side of the associated arm 23 to which it is secured by the bolts 23' and upwardly beyond the limits of the frame 19. The adjacent faces of the upstanding sides 26" of each pair of brackets 26 on one side of the chassis 10 are each provided with an integral boss 27 which is pierced centrally by a hole for the passage therethrough of a bolt 28 which extends transversely across the space defined by the said sides 26" of the associated brackets 26. A roller 29 is rotatably mounted in the usual manner on the central portion of each bolt 28 to be thereby disposed between the brackets 26. The facing peripheral surfaces of the rollers 29 on opposite sides of the chassis 10 project inwardly in the direction of each other beyond the limits of their associated brackets 26 to be received within a coacting peripheral groove or track 30 in a ring 31 which is designed to be freely rotatable on and over the surfaces of the rollers 29.

The upper portion of the ring 31 is open whereby the entire ring comprises something less than 360°. Each end of the ring 31 terminates in a boss 32 which projects perpendicularly from the outer surface thereof and is provided with a central bore or well 33 for the reception of a removable bar or rod 34 therein. The purpose and function of this bar 34 is to provide a handle at each end of the ring 31 to facilitate the rotation of the ring 31 over the rollers 29 relative to the chassis 10. When the ring 31 is located in its desired or selected position, each bar or handle 34 may be removed from its boss 32 and stowed in a tubular container 35 which is secured to or integrally formed on the outer surface of one of the uprights 21 of the frames 19 (Fig. 2).

In order to further facilitate rotation of the ring 31, a pair of auxiliary rollers 36 are interposed between the rollers 29 adjacent and tangentially to the circumference of the ring 31. These auxiliary rollers 36 are identical in every respect one to the other and to the rollers 29 and are symmetrically disposed one on either side of the vertical transverse centerline of the chassis 10.

To this end, a pair of complementary and aligned bearings 37 are secured in any suitable and well-known manner one to each inner surface of the transverse beams 18. Each of these bearings 37 extends upwardly above its associated beam 18 and terminates in an inwardly projecting boss 38 (Fig. 7). Each pair of bosses 38 is provided with centrally aligned apertures for the reception therein of a shaft 39 which extends transversely across the space defined by the adjacent bosses. A bushing 40 is press-fitted or similarly inserted in each boss 38 from the outer face thereof so as to define the aperture therein. An additional sleeve or bushing 41 is similarly fitted, at each of its ends, into the apertures of adjacent bosses 38 from the inner faces thereof whereby the bosses are interconnected one to the other to form, in effect, an integral member. One of the auxiliary rollers 36 is rotatably mounted centrally on each bushing 41, as at 42. Like the main rollers 29 each of the auxiliary rollers 36 extends into the groove or track 30 in the ring 31 with the peripheral surface thereof in contact with the base of the groove 30.

Figure 6:
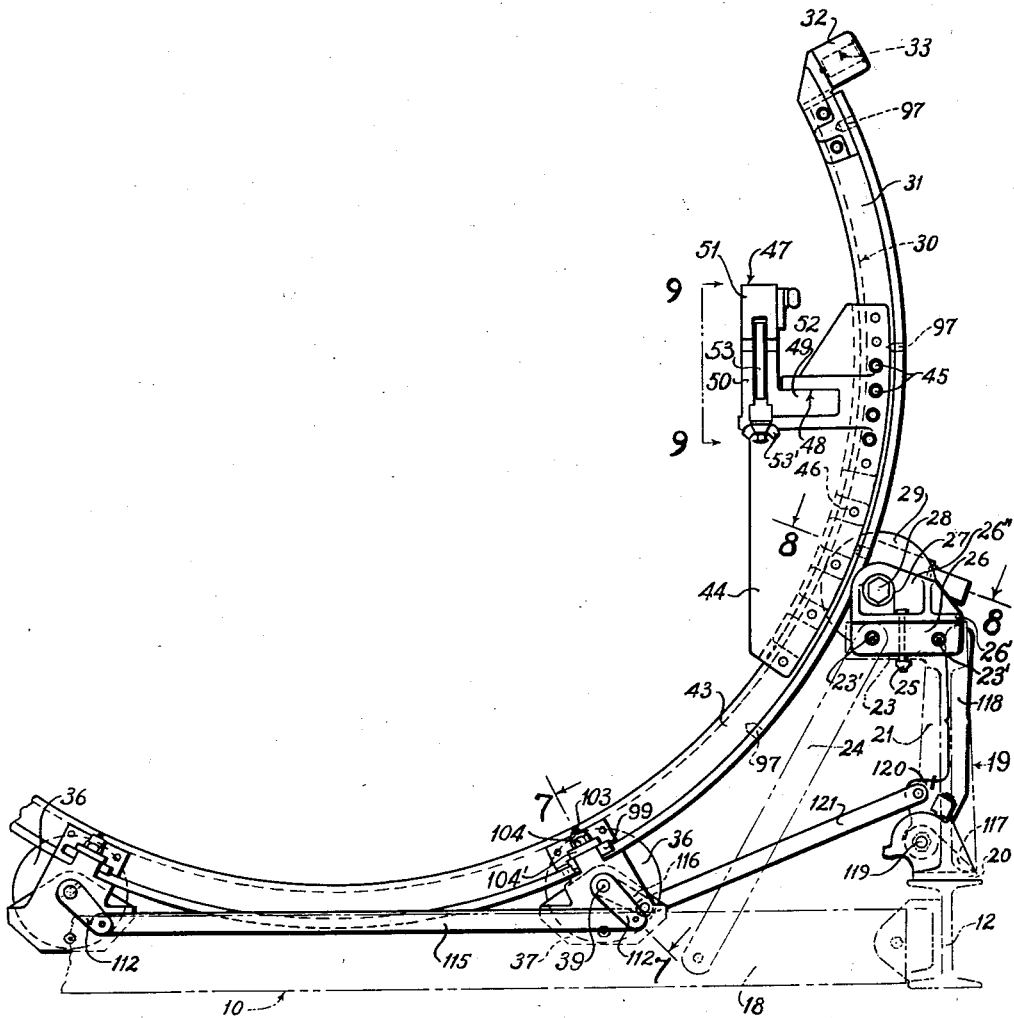
Fig. 6 is a section taken along line 6—6 of Fig. 1 to show the main supporting cradle for the engine and the means by which the position of the engine is manipulated and adjusted on and relative to the truck together with the lock mechanism by which the engine may be secured in selected positions, the dolly chassis being shown in phantom lines.

The inner peripheral surface of the ring 31, in opposition to the peripheral groove 30, projects inwardly, as at 43, to receive one side of a bracket 44 (Fig. 6). This side of bracket 44 is U-shaped in cross-section to fit snugly around the projection 43 whereby it may be secured thereto by means such as a plurality of bolts 45. If necessary, localized bosses 46 may be provided on the outer surfaces of this side of the bracket 44 one in the area of each bolt 45 for structural purposes and the ends of each bolt 45 may be countersunk to terminate flush with the opposed surfaces thereof. The secured side of the bracket 44 is arcuately formed for mating attachment to, and coaction with, the associated arc of the ring 31 and each bracket 44 is so located on the ring 31 that it is disposed in a common, horizontal plane when the ring is symmetrically positioned relative to the chassis 10.

At its other or inner side each bracket 44 is formed to receive a trunnion mount 47 which, in turn, is organized and arranged to receive and connect a complementary trunnion or projection carred by and extending laterally from opposed sides of the engine 11. To this end, the upper extremity of both brackets 44 is provided with aligned recesses 48 in which a laterally projecting flange 49 of the trunnion mount 47 may be received and secured in any suitable fashion.

Referring particularly to Fig. 9, each trunnion mount 47 consists of a base member 50 which is integral with the flange 49 and a coacting clamp member 51 which is pivotally hinged to one end of the base member 50. The abutting surfaces of these members 50 and 51 are formed with complementary semi-circular grooves in which a bushing element 52 is secured in the usual manner. The free or unconnected end of the clamp 51 terminates in a bifurcation to receive therein one end of a bolt 53 which is pivotally connected thereto by a pin 51'. The corresponding end of the associated base member 50 terminates in a lobe 50' the outer face of which is slotted to receive the shank of the bolt 53. A wing nut 53' is threadably associated with the outer or free end of the bolt 53 whereby the free or unconnected ends of the members 50 and 51 may be clampingly secured to each other when the shank of the bolt 53 is disposed in the slotted end 50' of said member 50.

Thus, when the journals projecting from the opposite sides of the engine 11 are placed or cradled in the base member 50 of the trunnion mount 47, the clamp member 51 is swung about its pivot to overlie the base member 50 and the two members are secured one to the other by means of the bolt 53. The engine 11 is thereby held in position and supported by means of its trunnions which are now disposed in and against the complementary bushing elements 52 of the mounts 47.

With the engine 11 thus secured to the ring 31 by means of and through the bracket 44, rotation of the ring 31 on the rollers 29 and 36 serves to rotate the engine about its axis whereby location of the external surface thereof is angularly adjusted.

For the purpose of balancing the engine when it is secured to and supported by the truck chassis 10 by the ring 31 in the foregoing manner, an auxiliary rotary ring or cradle 54 is provided in spaced relationship to the main ring 31. To this end a transverse structural beam 55 (Fig. 10) is secured adjacent the forward end of the chassis 10 to the side members 12 comparable in all respects to the beams 18 already described. Adjacent the opposed ends of the beam 55 a pair of upstanding aligned bracket plates 56 are secured by means 57. Each pair of bracket plates 56 terminates upwardly beyond the upper surface of the beam 55 whereby spaced arms 58 are created. The outer ends of these arms 58 are pierced by aligned transverse holes for the passage therethrough of a bolt 59. A roller 60 identical in every respect to the rollers 29 and 36 is rotatably mounted on each of the bolts 59 to be disposed between the arms 58 of the plate 56. These rollers 60 are designed to be received in and against the outer peripheral surface of the auxiliary ring 54 which is generally U-shaped in transverse section for this purpose.

Centrally disposed on the beam 55 are an additional pair of aligned upstanding bracket plates 61 which are generally triangular in shape and which are bolted one to the other and to opposite faces of the beam 55, as at 62. Thus, the apexes of the plates 61 form a pair of spaced arms which extend upwardly beyond the upper surface of the beam 55 and are provided with aligned apertures for the reception therein of a bolt 63 on which a supplemental roller 64 is rotatably mounted. This roller 64 is preferably smaller in diameter than the rollers 60, however, it is otherwise identical to the rollers 60 both in construction and function. In addition, the supplemental roller 64 is disposed with its peripheral surface in flush contact with the inner peripheral surface of the ring 54 whereby it acts in opposition to the rollers 60.

Like the main supporting ring 31 the auxiliary ring 54 is less than 360° and each of its ends terminates in a transverse wall or stop 65 which serves to close the U-shaped track at its ends to thereby limit the rotary movement of the ring 54 on and over the rollers 60 and 64.

The means by which the engine 11 is connected to the auxiliary ring 54 so that the auxiliary ring 54 rotates in unison with the main ring 31 consists of a pair of supporting rods or legs 66. These legs 66 are so positioned with reference to the ring 54 that, when the ring 54 is symmetrically disposed about the vertical centerline of the chassis 10, the main supporting leg 66 is disposed in substantially a vertical position while the auxiliary leg 66 is substantially horizontal. The outer end of each of the legs 66 terminates in a bifurcation 67 which straddles and receives therein the ring 54 to which it is fixedly secured in any appropriate manner.

At its opposite end the auxiliary leg 66 is welded or otherwise fixedly secured to the main leg 66 adjacent its free end which terminates outwardly thereof to be pivotally connected to the piston rod of a resilient cylinder 68. A pair of forked ears 69 projects laterally from the opposed ends of the cylinder 68 for fixedly connecting the cylinder 68 to a peripheral flange 70 provided on the engine 11 by means of lock pins or the like 71.

These lock pins 71 are of standard design and are available on the open market and per se form no part of this invention. Each consists of a plunger operative against a movable lateral projection or ball designed to work in opposition to the head of the plunger (Fig. 2). This lock pin is characterized by its quick and easy operation in the connection and disconnection of two members one to the other by merely forcing it into aligned holes in the members whereby the movable projection is compressed against the normal action of the plunger or spring until such time as the lateral projection clears the members at which time it is forced outward by the action of the spring. A retaining chain 72 is connected at one of its ends to the head of each pin 71 and at its other end to the associated cylinder 68 to prevent it from being removed from the assembly when it is not operatively employed lest it be mislaid or lost.

From the foregoing it is apparent that the main support for the engine 11 in and on the chassis 10 is provided by the connection of the engine trunnions to the ring 31. The purpose and function of the connection of the forward end of the engine 11 to the auxiliary ring 54 is merely to balance the engine on the main supporting ring 31. At the same time, however, this forward connection is such that any tendency of the engine to move vertically relative to the chassis 10 is suppressed.

Additional support of the engine 11 on the chassis 10 of the present truck is provided by means of and through a pair of rigid side braces 73 (Figs. 1 through 4) one of which is mounted on either side of the chassis 10 adjacent the forward auxiliary ring 54. Each of the braces 73 is rotatably mounted on the inner face of the opposed side members 12 by means of a bolt 74. Each brace 73 is hinged as at 74', at right angles to and adjacent the bolted end thereof whereby it is capable of substantial universal movement relative to the associated side member 12.

At its other or free end each side brace 73 terminates in an angularly disposed fitting 75 having a central passage therethrough for registration with a complementary passage in an adaptor plate 76 designed to be mounted to a peripheral flange of the engine 11 by a plurality of bolts 76'. A drop bolt or pin 75' passing through the aligned passages in the fitting 75 and plate 76 serves to rigidly secure the brace 73 to the engine 11. A chain 75" is provided between the head of pin 75' and the fitting 75 to retain the pin 75' to its associated brace 73 at all times to prevent its being lost or mislaid.

Each adaptor plate 76 is connected to the central portion of the associated side brace 73 by means of an interconnecting chain 77 which is fastened or clipped at one of its ends to the adaptor plate 76 and at its other end to the central portion of the side brace 73. When no engine is being held by and on the chassis 10, the adaptor plate 76 may be stored on the truck by securing it to the face of the adjacent end member 14 (Fig. 2) by means of the same bolts 76' employed to connect it to the flange of the engine 11.

With particular reference to Fig. 4, each side brace 73 comprises a pair of tubular components 73' interconnected by a threaded bolt 79 having a central nut 80 secured to, or integrally formed thereon. Thus, the over-all length of the side brace 73 may be adjusted within predetermined limits by tightening and untightening the bolt 79. When the side braces 73 are not in actual use they may be rotated on their respective bolts or pivots 74 into a position coplanar with the side members 12 and then swung or rotated in the direction of their associated members 12 on their hinges 74' to a position where they are substantially parallel with said members 12. When each brace 73 is so disposed its outer end is received in, and held by, a projecting hook 81 which is secured to and extends from the inner face of the associated member 12.

In conjunction with the side braces 73, for the support of the engine 11 on the chassis 10, are a pair of rear braces 82 which are adapted to be connected to the engine at right angles to the side braces 73. One of these braces 82 which are adapted to be connected to the engine rear member 13 in a manner substantially equivalent to that in which the side braces 73 are mounted to the side members 12. Like the side braces 73, the rear braces 82 are adjustable within predetermined limits and are each designed and adapted to engage a projecting coacting member 83 (Fig. 2) integrally formed on the associated aft end of the main supporting ring 31. Each rear brace 82 is connected to its companion projecting member 83 by means of and through a lock pin 84 comparable in all respects to the lock pins 71. A chain 85 identical to the chain 72 is provided to retain the lock pin 84 at all times attached to its associated brace 82.

When the rear braces 82 are not operatively connected to the engine 11 in the foregoing manner, they may be rotated toward the rear end member 13 where they are each engaged and supported by a fitting 86 equivalent in function to the projecting hook 81 described in conjunction with the side braces 73. In this manner the rear braces 82, as is also true of the side braces 73, whether operatively connected for the support of the engine 11 in and to the chassis 10, or disposed in their stowed position, at all times form an integral part of the present truck assembly.

However, prior to additionally securing the engine 11 in and to the chassis 10 through the braces 73 and 82 in the above manner, positive locking means is provided to secure it in the selected radial position in which it is first located by rotating the main ring 31. This locking means consists of a movable pin or detent 87 associated with and carried by each pair of brackets 26 (Fig. 8). To this end, one of the bosses 27 of each pair of brackets 26 is enlarged, as at 88, which enlargement is pierced by a bore or hole which extends transversely thereof. One end of a sleeve 89 is press-fitted in this hole and secured thereto by a lock ring or nut 90 which abuts the outer face of the enlargement 88. A longitudinal slot 91 is provided in the outer end of the sleeve 89 to receive and slidably house therein an angularly disposed handle 92. This handle 92 is secured to or integrally formed on the outer end of a slide bolt 93 which extends through the transverse hole of the enlargement 88.

Medially of the length of the slide bolt 93 is a peripheral collar 94 which is immovably secured thereto and is operative against a shoulder 95 formed internally of the transverse hole in the enlargement 88 whereby the inward extension of the slide bolt 93 is limited. A compression spring 96 encircles the bolt 93 and is operative between the shoulder 95 and the inner face of the sleeve 89 tending always to move the bolt 93 transversely or inwardly of the enlargement 88 with the collar 94 thereof in abutting contact against the shoulder 95. In this position the head 93' of the slide bolt 93 projects laterally and outwardly of the boss 27. A plurality of holes 97 are provided at predetermined spaced intervals along the rim of the ring 31 adjacent the groove or track 30 therein to receive the head 93' of the bolt 93 when the ring is rotated to bring said holes into registration therewith.

When it is desired to remove the bolt 93 from locking engagement with the ring 31 as aforesaid, in order that the ring may be rotated to a new or different position, the bolt 93 may be withdrawn from the selected hole 97 by moving the handle 92 outwardly in its slot 91 against the normal action of the spring 96. Then, by merely rotating the handle 92 to either side of the slot 91, the bolt 93 is retained in this position. After rotation of the ring 31 to the desired new position the handle 92 is simply rotated back into registration with its slot 91. When the handle 92 is then released the bolt 93 is automatically driven home into the selected hole 97 by the action of the spring 96.

Since the present truck is designed for transportation of the engine 11 over road and in and around localized areas, as hereinabove set forth, it is desirable that selective means be provided for additionally locking the engine against accidental movement relative to the chassis 10. This locking means is associated with and carried by the auxiliary rollers 36 mounted on the transverse structural beams 18. To this end the shafts 39 (Figs. 6 and 7), on which each of the rollers 36 is mounted, extend beyond the outer limits of their respective bearings 37. Adjacent the outer opposed ends of each shaft 39 is an upstanding support 98 which is immovably secured to the upper surface of the associated beam 18 in any suitable and well-known manner. A latch 99 is pivotally connected to the outer or upper end of each support 98 by means of a pivot pin 100, the end of the latch 99 being bifurcated to straddle the end of the support 98. At its opposite end each latch 99 terminates in a laterally disposed projection or dog 101.

Medially of its length, each of the latches 99 is pierced by an aperture for the passage therethrough of a bolt 102 which terminates in a threaded end 103 for cooperative engagement with a complementary retaining nut 104 operative against the outer surface of its associated latch 99. The inner end of each nut 104 terminates in an integral flange 104' the face of which is shaped or angularly disposed relative to the longitudinal centerline of the bolt 102 to maintain the shank of said bolt substantially concentric within the aperture in the latch 99 at all times. At its other or inner end each bolt 102 terminates in an integral loop or eye 105 the inner periphery of which engages and abuts the outer periphery of a collar 106 which encircles, and is fixedly secured to, the shaft 39 by means of a transverse pin 107. The peripheral surfaces of the collars 106 are provided with localized integral projections or cams 108 whereby the rotary movement thereof in unison with shafts 39 serves to simultaneously displace all of the bolts 102 laterally relative to their respective shafts 39. Adjacent their outer ends the collars 106 are each provided with an integral flange 106' designed to abut and work in opposition to the outer face of the bushing 40 for the retention of the bolt 102 on the collar 106.

Adjacent the threaded end of each bolt 102 the shank thereof is reduced in diameter to create a peripheral shoulder 109. A compression spring 110 is disposed about this reduced portion of the shank for engagement at its opposed ends against the inner surface of the latch 99 and the shoulder 109 whereby the latch is normally forced outwardly relative to the associated shaft 39. Thus, when the shafts 39 are rotated in one direction the cams 108 on the collars 106 are simultaneously operative on and against their respective eye-bolts 102 to move them in unison laterally and inwardly of their associated shafts 39 against the action of the springs 110 whereby the dogs 101 are brought into clamping engagement with the rim of the ring 31. However, upon rotation of the shafts 39 in the other direction substantially 180° the cams 108 are operative on and against their respective bolts 102 to move them in unison outwardly of their associated shafts 39 whereby the latches 99 are permitted to move outwardly under the action of the springs 110 for the release of the rim of the ring 31 by the several dogs 101. If desired, that portion of the rim of the ring 31 which is intended to be clampingly engaged by each of the dogs 101 of the latches 99 may be reinforced by an angle plate 111 or its equivalent.

In order to rotate the shafts 39 on opposite sides of the longitudinal centerline of the chassis 10 in unison corresponding ends of the shafts are made to extend beyond the extremity of the associated beam 18 and each is provided with a laterally projecting arm 112. Each arm 112 is secured to its associated shaft 39 by means of a pin 113 whereby it is, in effect, an integral part of its shaft 39. The arms 112 terminate at their outer end in bifurcations 114 for the reception therein of the opposed ends of an interconnecting rod 115 (Figs. 1 and 6) which may be bolted or otherwise secured thereto.

One of the shafts 39 similarly extends beyond the limit of the associated beam 18 and is provided with a laterally projecting arm 116 identical in every respect to the arms 112. In transverse alignment with the lateral arm 116 is an upstanding channeled bracket 117 (Fig. 2) which is mounted to the upper surface of the side member 12 on the adjacent side of the chassis 10. An operating lever or handle 118 is pivotally mounted in and to the channeled bracket 117 by means of a transverse bolt 119. On the inner side of the handle 118, adjacent the pivoted end thereof, is an integral ear or lobe 120 (Fig. 6). An interconnecting link 121 is pivotally secured at its opposed ends to the arm 116 and the ear 120, respectively, whereby movement of the handle 118 about its pivot 119 serves to drive the interconnected shafts 39 in unison for the operation of the latches 99 to clampingly engage and disengage the ring 31.

At each corner of the chassis 10 a wheel assembly 122 is provided. Each of these assemblies 122 is substantially identical one to the other and is mounted (Figs. 12 and 13) to the bottom face of the associated interconnected extremities 14 of the end and side members 12 and 13 by means of mounting plate 123 which is fixed thereto by a plurality of bolts. The central portion of the lower surface of the mounting plate 123 (Fig. 12) projects outwardly or downwardly to be received within the complementary recess in a coacting disc member 124 with which it is rotatably associated by means of a roller bearing 125. The mounting plate 123 and the complementary disc 124 are each provided with a central aperture one in alignment with the other for the reception therein of a bolt 126 the head of which seats in the upper face of the plate 123, as at 127. The opposed end of the bolt 126 terminates in a threaded end for coaction with a complementary nut 128 which is tightened thereon to secure the plate 123 and the disc 124 one to the other against relative movement. A pin or key 129 may be employed to pierce the nut 128 and the associated end of the bolt 126 to prevent retrograde movement of the nut thereon.

At and along a portion of the periphery of the disc 124 is a downward projecting or depending, integral arm 130 (Fig. 13). The outward or lower end of this arm 130 is pierced by a hole for the passage therethrough of an axle or hub 131. The portion of the arm 130 defining the hole therein may be enlarged by an inwardly projecting boss 132 for strengthening purposes. The opposed ends of the axle 131 are threaded to accommodate retaining nuts 133 which are locked thereon by means of locking pins or keys 134 identical, in every respect, to the pin 129. A wheel 135 similar to that generally employed on automobiles is rotatably mounted on that portion of the axle 131 between the inner face of the boss 132 on the arm 130 and the nut 133 working in opposition thereto whereby the vertical axis of the wheel 135 is disposed in a plan common to that of the center of the mounting plate 123.

From the foregoing it is apparent that each wheel 135 is so mounted on and to the chassis 10 of the present truck that said truck may be readily rolled on and over the ground or similar surface. At the same time each of the wheels 135 may be freely castered whereby the dolly or truck may be moved in any desired direction.

Since it is not always desirable that the wheels 135 be freely casterable, especially when the truck is being transported on the road, locking means 136 (Fig. 12) is provided to set or secure them in a fixed position relative to the chassis 10. More specifically, this locking means 136 comprises a laterally extending ear 137 integrally formed on the under side of the mounting plate 123 adjacent the outer end thereof. A sleeve 138 is press-fitted or otherwise secured in a transverse hole provided in the ear 137. A spring-loaded finger 139 is slidably disposed in the sleeve 138 and terminates at its outer end in a transverse handle 140. The length of the finger 139 is such that under the normal action of its spring it is disposed inwardly of the sleeve 138 beyond the inner limit thereof to rest in a selected one of a plurality of complementary aligned apertures 124' provided in the disc 124. Any desired number of apertures 124' may be provided at predetermined intervals in the peripheral face of the disc 124.

The outer end of the sleeve 138 is provided with a pair of diametrically opposed slots 141 to receive and accommodate the handle 140 when the finger 139 is permitted to move under the normal action of its spring. A pair of diametrically opposed grooves or depressions 142 are provided at right angles to the slots 141 on the outer end of the sleeve 138. Thus, when it is desired to effect free castering of the wheels 135, the finger 139 is withdrawn from the aperture 124' of the disc 124 by an outward pull on the handle 140 and the handle is rotated substantially 90° where it is seated in the depressions 142 to retain the finger 139 out of its locking position against the normal action of its spring.

During road transportation of the present dolly or truck the wheels 135 are all locked in a fore and aft position in the foregoing manner. The fore and aft position of the wheels therefore, may be said to be the usual or normal position. However, in the movement of the truck in and around localized areas it may be desired to change the position of the wheels 135 relative to the chassis 10 and lock them in a new position. This may be accomplished by and through the locking means 136, i.e., by operatively connecting the finger 139 thereof in the appropriate aperture 124' in the manner just described.

At still other times it is desirable that each of the wheels 135 be locked against rotation on its hub or axle 131. One such time for example, would be when the truck is located in a desired spot convenient for working on or servicing the engine 11. For this reason an individual brake mechanism is associated with, and operable on, each of the wheels 135 whereby it becomes impossible to roll or move the truck. To this end the bolt 126 of each wheel assembly 122, is pierced by a central hole or bore for the passage therethrough of a rod 143. At its lower end the rod 143 is provided with a gripping or clamping shoe 144 which is mounted thereon and secured thereto by means of a nut 145. This nut 145 works in opposition to a shoulder 143' formed on the rod 143 on the opposite side of the shoe 144. If desired, a washer 146 may be disposed between the shoe or plate 144 and the nut 145 in the usual manner. A bushing 147 lines the aperture in the shoe 144 through which the rod 143 passes.

The clamping plates or shoes 144 are arcuately shaped to conform to the surface or tread of the associated tires of the wheels 135 and each plate 144 is provided with a plurality of serrations 148 on the working surface thereof for engagement against the tread of the tire.

Adjacent its opposed ends each of the clamping plates or shoes 144 is pierced by a hole 149 which is located and adapted to receive a complementary guide pin 150 secured to, as at 150', and projecting downwardly from, the lower face of the disc 124 for slidable engagement in the hole 149 of the shoe 144.

At its other or upper end each rod 143 terminates in an enlarged head 151 which is threadably secured thereto to be disposed above the upper surface of the chassis 10. More specifically the associated corner of the chassis 10 is pierced by a hole or bore in which is disposed a press-fitted or otherwise secured bushing 152 which is adapted and designed to receive and slidably mount the rod 143 therein. Between the upper end of the bushing 152 and the enlarged head 151 of the rod 143, is a resilient member such as, for example, a compression spring 153 normally operative therebetween to force the rod 143 upwardly relative to the chassis 10. In order that the rod 143 may be so moved, a portion of it adjacent its lower end through which the locking pin 129 passes, is provided with a transverse slot 154 to permit limited sliding movement of the rod 143 relative to said pin 129.

An upstanding supporting bracket 155 is fixedly secured to the upper surface of the chassis 10 to be disposed around, and substantially enclose, the upper end of each rod 143. This bracket 155 consists of a plate disposed in abutting contact with the upper surface of the chassis 10 at each opposite end of which is formed a laterally projecting arm. The upper ends of the arms of each bracket 155 are pierced by aligned holes for the reception therein of the opposite ends of a shaft 156 which traverses the space between said arms. The outer ends of the shafts 156 are each provided with an enlarged head 157 to secure the shaft against lateral movement relative to its bracket 155.

An eccentric roller or cam 158 is splined or keyed to the central portion of each shaft 156 for rotation in unison therewith, the working face of each of said rollers 158 being organized and arranged for abutting contact with the upper surface of the enlarged head 151 of the rod 143 at all times due to the operation of the spring 153. An integral projection or crank 159 extends from the peripheral surface of each eccentric roller 158 and terminates in a hand lever (not shown) or similar handle by and through which the roller 158 may be rotated.

Thus, upon rotation of the handle of the crank 159 in one direction the enlarged cam surface of the attached roller 158 is forced against the head 151 of the rod 143 to force the shoe 144 at the other end thereof downwardly into abutting contact with the surface or tread of the tire of the associated wheel 135 whereby said wheel is locked against rotation on its hub 131. Rotation of the handle of the crank 159 in the opposite direction, however, rotates the attached eccentric roller 158 in a corresponding direction to permit the shoe 144 to be raised upwardly out of contact against the surface or tread of the tire of the wheel 135 under the normal action of the spring 153 whereby said wheel is free for unrestricted rotation on its hub 131.

In order to limit the rotary movement of each eccentric roller 158, whereby the maximum downward force of said roller on and against the head 151 of each rod 143 may be effected to lock each wheel 135 against rotation on its hub 131 in the foregoing manner, a stop member 160 may be provided. Each of these stops 160 may consist of a transverse bar or rod secured to the outer ends of the arms of each supporting bracket 155 so as to be fixedly disposed across the space defined by said arms. In this way the mechanic or operator of the present truck is not required to observe and determine when the shoes or brakes 144 are fully applied. He has merely to rotate each crank or lever 159 to a position where it abuts and rests against its stop 160.

Since steerability of the present truck is a desirable feature especially during its operation on the road as hereinabove set forth, each of the front wheels 135 are interconnected one to the other and to a tongue 161 (Figs. 1 and 5). A radius rod 162 is fixedly secured by means of one or more bolts 163 to the depending arm 130 of both front wheel assemblies 122. Each of these rods 162 extends in a rearward direction relative to the chassis 10 and substantially at right angles to the associated arm 130. Interconnecting links 164 join the free ends of the radius rods 162 one to the other and these links 164 are, in turn, pivotally interconnected at their adjoining ends to an extension 165 of the tongue 161 which is pivotally secured medially of its length to the forward end member 13 by a bolt 166.

Each of the links 164 intersects the associated corner brace 15 of the chassis 10 passing through the respective slot 17 thereof. For the purpose of manufacturing simplicity, each link 164 may comprise three component parts, to wit, a central tubular element and a pair of terminal elements one of which is rigidly secured to each end of the central tubular element by one or more pins or bolts 167.

The free end of each radius rod 162 is pivotally connected to the associated end of the interconnecting link 164 by a drop bolt 168 which passes through aligned apertures provided in the overlapping ends of said rod 162 and said link 164. Each of these drop bolts 168 is formed with an angularly disposed head 169 to prevent the bolt from dropping completely through the apertures of the rod 162 and link 164.

The end of each brace 15 associated with the outer end of each link 164 is provided with an angularly disposed bracket 170 which may be bolted, or otherwise secured, to the face of the brace 15. The outer end of each of these braces 170 is pierced by an aperture substantially equal in size to that in the outer ends of the rods 162 and links 164. When it is desired to disconnect the radius rods 162 one from the other, through their interconnecting links 164, to render the present truck non-steerable each drop bolt 168 is withdrawn from the aligned apertures in the associated rod 162 and link 164. Each link 164 is then moved or rotated to a point where its aperture registers with that in the outer end of the adjacent bracket 170 and the bolt 168 placed therein for the interconnection thereof. The forward wheels 135 may thus be locked in a fixed position relative to each other, i.e., are made to function exactly like the rear wheels 135.

A retaining chain 172 may be anchored at one of its ends to each of the brackets 170 and at its other end to the head 169 of the associated drop bolt 168 to prevent it from becoming disengaged and possibly lost when it is not being employed for the connection of the link 164 to either the radius rod 162 or to the bracket 170 in the foregoing manner.

The central portion of the front end member 13 is slotted, as at 173 (Fig. 3) to permit the passage therethrough of the tongue extension 165 and the pivot bolt 166 is appropriately secured to the upper and lower faces of the end member 13. The forward end of the extension 165 terminates in a laterally disposed boss 174 which is pierced centrally by a longitudinal hole. The aft end of the tongue 161 terminates in a fork 175 formed either integrally thereon or at the end of a separate member 176 which is immovably secured to the end of the tongue. Aligned transverse holes pierce the projecting ears or tines of the fork 175, adapted for registration with the hole in the boss 174 whereby the tongue 161 may be pivotally connected to its extension 165 by means of and through a locking pin 177 which is substantially identical to the locking pin 71 already described. A retaining chain 178, like the chain 72, connects the head of the locking pin 177 to the end member 13 to secure it to the chassis 10 at all times, especially when it is not operatively connected as aforesaid.

At its other or forward end, the tongue 161 terminates in an open loop fitting or eyelet 179 to permit its connection to a towing truck or the like.

From the foregoing it is now apparent that, by means of and through the mechanism just described, the present truck is adapted to be towed. At the same time rotation of the tongue 161 about its pivot 166 causes the reciprocation of the interconnecting links 164 when operatively connected to their radius rods 162 for a corresponding rotation of the forward wheels 135. When it is desired to disconnect the steering mechanism as, for example, when it is desired to locate the truck or dolly in a stationary position or when it is desired to convert the wheels 135 to free castering, as above described, the links 164 are each disconnected from their companion radius rods 162 by removal of the drop bolts 168 and are connected to their respective brackets 170 to thereby become fixed and locked against further movement relative to the chassis 10.

When the steering mechanism is thus disconnected it may be desirable to remove or disassemble the tongue 161 from its operative position on the truck. In this case, the locking pin 177 may be withdrawn for the disconnection of the tongue 161 from its extension 165. The tongue may now be removed and stowed on a pair of depending hooks 180 (Fig. 2) which are secured to, so as to project downwardly from, the lower face of one of the side members 12 of the chassis 10. In this way the tongue 161 is completely taken out of the way and at the same time remains conveniently located on, as a part of, the truck, accessible for subsequent reassembly in its operative position.

When it is desired to anchor or secure the present truck in a desired location, for example during test operation or initial run up of the engine thereon, the brake mechanism, hereinabove described in connection with each of the wheels 135, is applied. However, in many operations for which the present truck is designed, e.g., transporting the truck on board freight car, aircraft carrier, etc., supplemental means is required for the attachment of the truck to associated, fixed structure whereby the possibility of the truck skidding, tipping over or otherwise moving relative to the surrounding stationary structure is completely eliminated.

In anticipation of such a case a plurality of tie-down fittings or rings are provided, one or more adjacent each corner of the chassis 10. Each of these tie-down fittings consists of an eyelet or loop which may be integrally secured to the chassis 10, as at 182, or pivotally hinged thereto, as at 183 (Figs. 1, 2 and 3). Where it is desired to employ hinged fittings for this purpose, a laterally projecting flange or gusset 184 may be provided on the chassis 10 to receive the inner end of the fitting 182 which terminates in a pair of projecting arms 185. The arms 185 of each fitting 181 straddle and are pivotally secured to the associated gusset 184 by any suitable and well-known means. Rope, wire, cable, etc., passed or threaded through each fitting 182 and 183 is drawn or tightened to remove the slack therein and is anchored or tied to the associated, fixed structure whereby an equal force is applied on the truck in all directions.

In the event that it may be desired to couple two or more of the present trucks one to the other whereby to form a train, or for other movement and manipulation of the truck, a rear tow-connection or hitch 187 (Fig. 1) is provided at the aft end of the chassis 10. This hitch 187 may be bolted or otherwise secured to the rear face of the rear end member 13 in the center thereof being designed and adapted to receive and lock the eyelet 179 of the tongue 161 of a second truck or the equivalent.

What is claimed is:

1. A dolly to receive and mount an engine comprising a chassis, a main supporting ring mounted adjacent one end of said chassis for rotation relative thereto, an auxiliary supporting ring independently mounted adjacent the other end of said chassis for rotation relative thereto, retaining and supporting means carried by the main ring adapted to engage the engine against lateral movement, means carried by the auxiliary ring and adapted to be removably connected to the engine to restrain and suppress relative lateral movement therebetween whereby the position of the engine is adapted to be maintained and balanced on said retaining and supporting means, an index assembly carried by the chassis and engaging the main ring against rotation in substantially any selected position relative to the chassis, a plurality of releasable locks engaging the main ring at spaced intervals along the periphery thereof to secure it in the selected position, an interconnecting mechanism between said locks for the unitary and simultaneous operation thereof, and a plurality of adjustable braces rigidly disposed between and adapted to connect the engine to the chassis to supplement the operation of said retaining and supporting means and said locks in immovably connecting the engine to the chassis.

2. A dolly to receive and mount an engine comprising a chassis, independent forward and rearward retaining and supporting members permanently mounted on the chassis for rotation in a fixed plane, said members including connectors adapted to fixedly secure the engine thereto, rollers mounted on the chassis in fixed position and engaging said members for the radial displacement of the latter relative to the former, and a plurality of interconnected locks operable in unison to render said rollers inoperable whereby said members may be immovably secured in any angular position on said chassis.

3. In an engine dolly the combination with a cradle mounted on and carried by the chassis of said dolly and adapted to receive and hold the engine therein and antifriction means operable between the chassis and the cradle for the rotation of said cradle on said chassis whereby the position of the engine is displaced radially, of a lock assembly to secure the cradle against rotation relative to the chassis comprising at least two spaced shafts mounted for rotation on the chassis and transversely disposed relative to the cradle, a latch pivotally mounted at one of its ends on the outer end of each shaft with its free end overlapping the corresponding edge of the cradle, an eccentric collar carried by and secured to each shaft adjacent each latch thereon, an eye bolt mounted for rotation in a fixed position on each of said collars to project laterally from the shafts with its shank slidably engaging the free end of the associated latch, a compression spring mounted on each shank between the faces of each latch and head of the associated bolts whereby all said latches are forced outwardly of said bolts, and means for rotating the shafts in unison approximately one half a turn in either direction to thereby force the latches inwardly into clamping engagement with the cradle against the action of the spring or allow the latches to move outwardly out of engagement with the cradle under the action of the spring.

4. The combination with a dolly having a chassis to receive and hold an engine, of a supporting cradle adapted to be releasably connected to the engine and mounted for rotation in a fixed position on the chassis whereby the plane of the engine is adapted for radial adjustment only on said chassis, an index assembly carried by the chassis and releasably engaging said cradle to locate it in a selected radial position relative to the chassis, a releasable lock mechanism to secure the cradle in the selected position, and a plurality of braces pivotally secured at corresponding ends to the chassis and terminating at their opposite ends in connectors adapted to engage the engine and immovably secure it to the chassis.

5. The combination with a dolly having a chassis adapted to receive and hold an engine, of a supporting cradle, a mount carried by said cradle and adapted to be releasably and pivotally connected to the engine, rotary means carried by said chassis and fixedly connected to said mount for swinging said mount relative to said chassis whereby the engine is adapted to be rotated about its axis only when connected as aforesaid, an index assembly carried by the chassis and releasably engaging said cradle to locate it in any one of a plurality of predetermined positions whereby the engine is adapted to be located in a selected radial position relative to the chassis, a releasable lock mechanism carried by the chassis to secure said cradle in the selected position, and a plurality of adjustable braces carried by the chassis and adapted to be connected to the engine to supplement the operation of the lock mechanism.

6. The combination with a truck assembly to receive and mount an engine, of a generally rectangular chassis the corner portions of which are disposed in a common plane substantially above and parallel to that of the remainder of the chassis, a wheel mounted on and carried by the chassis adjacent each of the corner portions aforesaid whereby the major portion of the chassis is disposed substantially in the plane of the centers of the wheels, an engine mounting cradle mounted on the chassis for rotation in a fixed plane and adapted to be connected to the engine, and a plurality of adjustable connectors adapted to be interposed between the chassis and the engine and to secure the former to the latter against all relative movement.

7. The combination with a truck assembly to receive and mount an engine, of a rectangular chassis, a set of forward and a set of rear wheels rotatably mounted on and carried by said chassis to facilitate its movement on and over a surface, an upstanding mount carried by the chassis on each longitudinal side thereof, each of said mounts including a connector complemental to trunnions on the engine to be received and engaged by said mounts whereby the engine when thus received and engaged is secured against movement relative to the chassis, and a plurality of fittings mounted in opposition one to the other on all sides of the chassis for connection of said chassis to immovable associated structure.

8. The combination with a roadable dolly for an engine including a chassis mounted on wheels, of means for converting the dolly into a stationary workstand for said engine, said means comprising a cradle permanently mounted on said chassis and adapted for connection to the engine, braces connectable at opposite ends to the chassis and to the cradle and the engine respectively whereby the engine is adapted to be immovable relative to the chassis, rollers carried by the chassis and disposed in the plane of the cradle for engagement therewith whereby said cradle may be rotated relative to said chassis and the position of the engine is adapted to be adjusted radially, a plurality of rigid braces each terminating in connectors at its opposed ends adapted to engage and secure the engine and chassis respectively against relative movement, and fittings mounted in opposition one to another on sides of the chassis for the connection of said chassis to immovable structure.

9. The combination with a dolly having a generally rectangular chassis to receive and mount an engine, of a pair of individual retaining and supporting rings for said engine mounted on said chassis adjacent its opposed ends, a mount fixedly carried by one of the rings adapted to engage and pivotally secure the engine thereto, a connector on the other ring adapted to fixedly secure the engine thereto, a shock absorber interposed between said connector and said other ring whereby the engine when secured as aforesaid is capable of predetermined lateral movement relative to the chassis, roller means disposed between the chassis and each of the rings for rotation of said rings relative to the chassis whereby the position of the engine on the chassis adapted to be angularly displaced, a releasable lock clampingly engaging said one ring and secure it in a selected fixed position relative to the chassis, and adjustable braces fixedly connectable to the chassis and to the engine to supplement the operation of the mount and lock aforesaid in securing the engine and chassis against relative movement.

10. The combination with a dolly having a generally rectangular chassis to receive and mount an engine, of a main ring mounted on said chassis adjacent one end thereof adapted to retain and support said engine, a mount fixedly carried by said ring adapted to engage and pivotally secure the engine thereto, a supplementary ring mounted on said chassis adjacent the other end thereof adapted to support said engine, shock absorbing struts adapted to connect the corresponding end of the engine to said supplementary ring, a track on each of said rings, rollers carried by the chassis and disposed within each of said tracks for rotation of the rings on the chassis whereby the position of the engine is adapted to be angularly adjusted on the chassis, and a releasable lock clampingly engaging one of said rings whereby the engine is adapted to be secured in the adjusted position.

11. In an engine dolly, the combination with a chassis, a cradle mounted on and carried by said chassis and adapted to receive and hold the engine therein and antifriction means operable between the chassis and the cradle for the rotation of said cradle on said chassis whereby the position of the engine is adapted to be displaced radially, of a lock assembly to secure the cradle against rotation relative to the chassis comprising at least two spaced rotary shafts mounted in fixed position on the chassis and transversely disposed relative to the cradle, means connecting said shafts for operation in unison, a latch pivotally mounted at one of its ends on the outer end of each shaft with its free end in overlapping association with the corresponding side of the cradle, resilient means normally operative on each of said latches to move them outwardly of the cradle, an eccentric connection between each shaft and the free end of the associated latch whereby approximately 180° rotation of the shafts in one direction permits the normal operation of the resilient means and approximately 180° rotation of the shafts in the opposite direction moves the respective latches against the normal operation of the resilient means whereby said latches clampingly engage the cradle, and means for the rotation of one of said shafts.

References Cited in the file of this patent

UNITED STATES PATENTS

| | | |
|---|---|---|
| 1,236,246 | Amelung | Aug. 7, 1917 |
| 1,287,292 | Gordon | Dec. 10, 1918 |
| 1,389,068 | Olson | Aug. 30, 1921 |
| 1,463,882 | Fuller | Aug. 7, 1923 |
| 1,887,379 | Orr | Nov. 8, 1932 |
| 2,530,333 | Jost | Nov. 14, 1950 |
| 2,650,100 | Ronning | Aug. 25, 1953 |
| 2,703,252 | Blackwell | Mar. 1, 1955 |
| 2,712,874 | Murray | July 12, 1955 |
| 2,727,637 | Weaver | Dec. 20, 1955 |
| 2,741,830 | Lewis | Apr. 17, 1956 |
| 2,820,644 | Smith | Jan. 21, 1958 |